United States Patent [19]
Chubb

[11] 3,972,183
[45] Aug. 3, 1976

[54] GAS DISSOCIATION THERMAL POWER SYSTEM

[76] Inventor: Talbot A. Chubb, 5023 N. 38th St., Arlington, Va. 22207

[22] Filed: Apr. 17, 1975

[21] Appl. No.: 568,970

[52] U.S. Cl. .................... 60/641; 60/659; 60/648; 126/263; 122/271
[51] Int. Cl.² .......................... F03G 7/00
[58] Field of Search .......... 122/21; 126/263, 270, 126/271; 60/641, 648, 649, 673, 659

[56] References Cited
UNITED STATES PATENTS

| | | | |
|---|---|---|---|
| 549,765 | 11/1895 | Calver | 126/270 |
| 2,551,823 | 5/1951 | Buttner et al. | 126/263 X |
| 2,933,885 | 4/1960 | Benedek et al. | 60/659 |
| 3,107,052 | 10/1963 | Garrison | 126/271 X |
| 3,203,167 | 8/1965 | Green | 60/641 |
| 3,293,851 | 12/1966 | Hulbert et al. | 60/648 X |
| 3,370,420 | 2/1968 | Johnson | 60/649 |
| 3,576,424 | 4/1971 | Strapp et al. | 60/659 X |

*Primary Examiner*—Martin P. Schwadron
*Assistant Examiner*—H. Burks, Sr.
*Attorney, Agent, or Firm*—R. S. Sciascia; Philip Schneider; Melvin L. Crane

[57] ABSTRACT

A gas dissociation solar thermal power system in which $SO_3$ in a solar furnace is heated by a sun ray reflector. The $SO_3$ dissociates into $SO_2 + O_2$ + absorption of heat. The $SO_2 + O_2$ gas is directed through a salt-heat chamber where it recombines into $SO_3$ and gives off heat. The $SO_3$ is directed back to the solar furnace and repeats the cycle. Useful heat is taken from the salt-heat chamber for operation of an electrical generator or other desired equipment.

10 Claims, 9 Drawing Figures

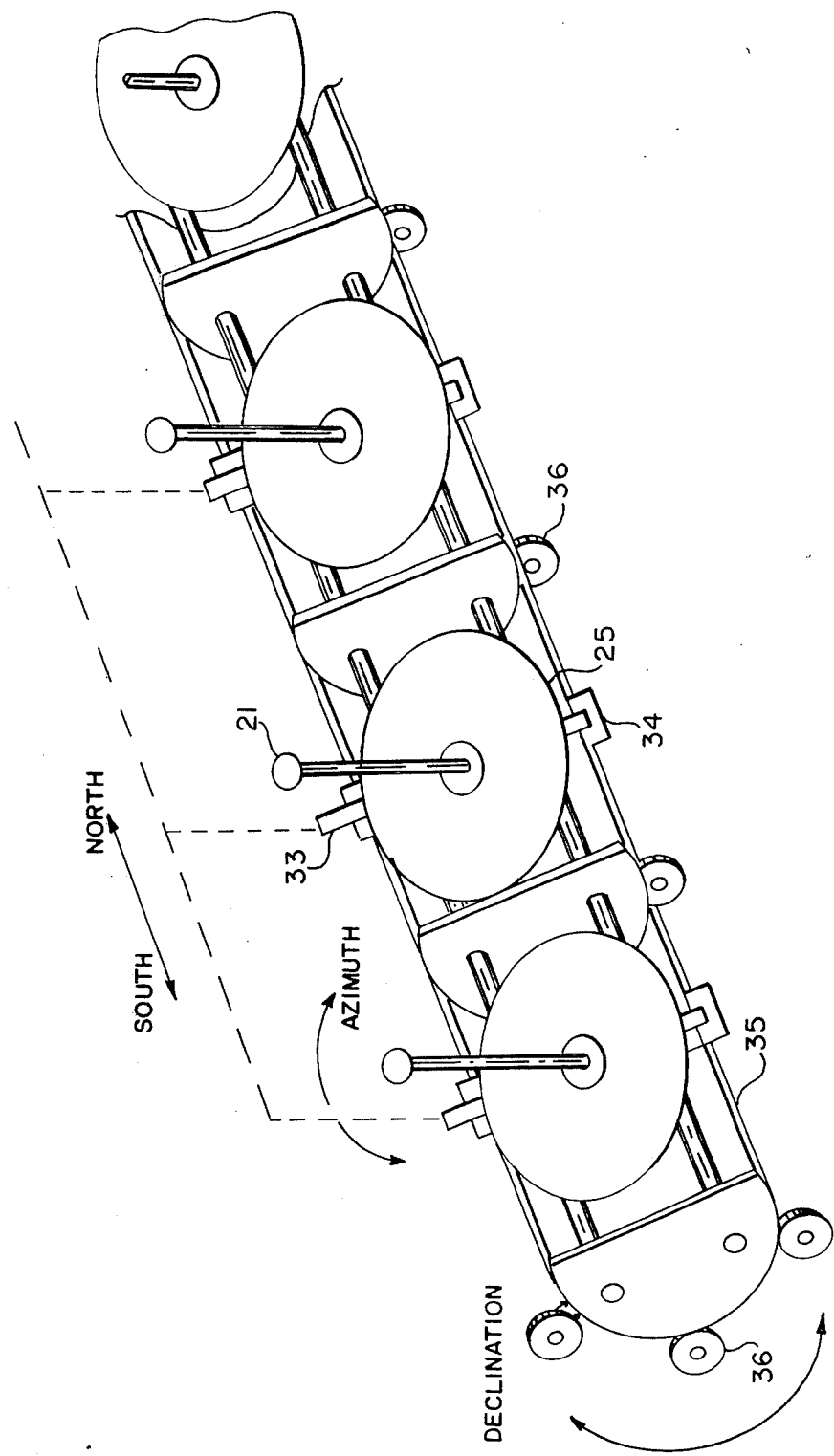

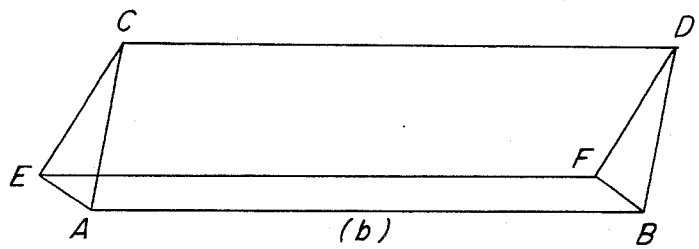
FIG. 6A
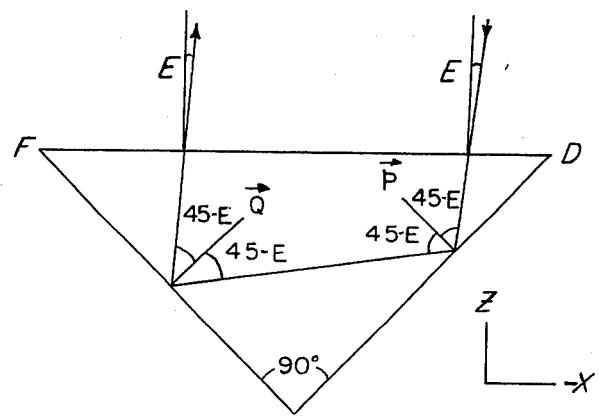
FIG. 6B
PROJECTION ON THE XZ PLANE (d)
FIG. 7
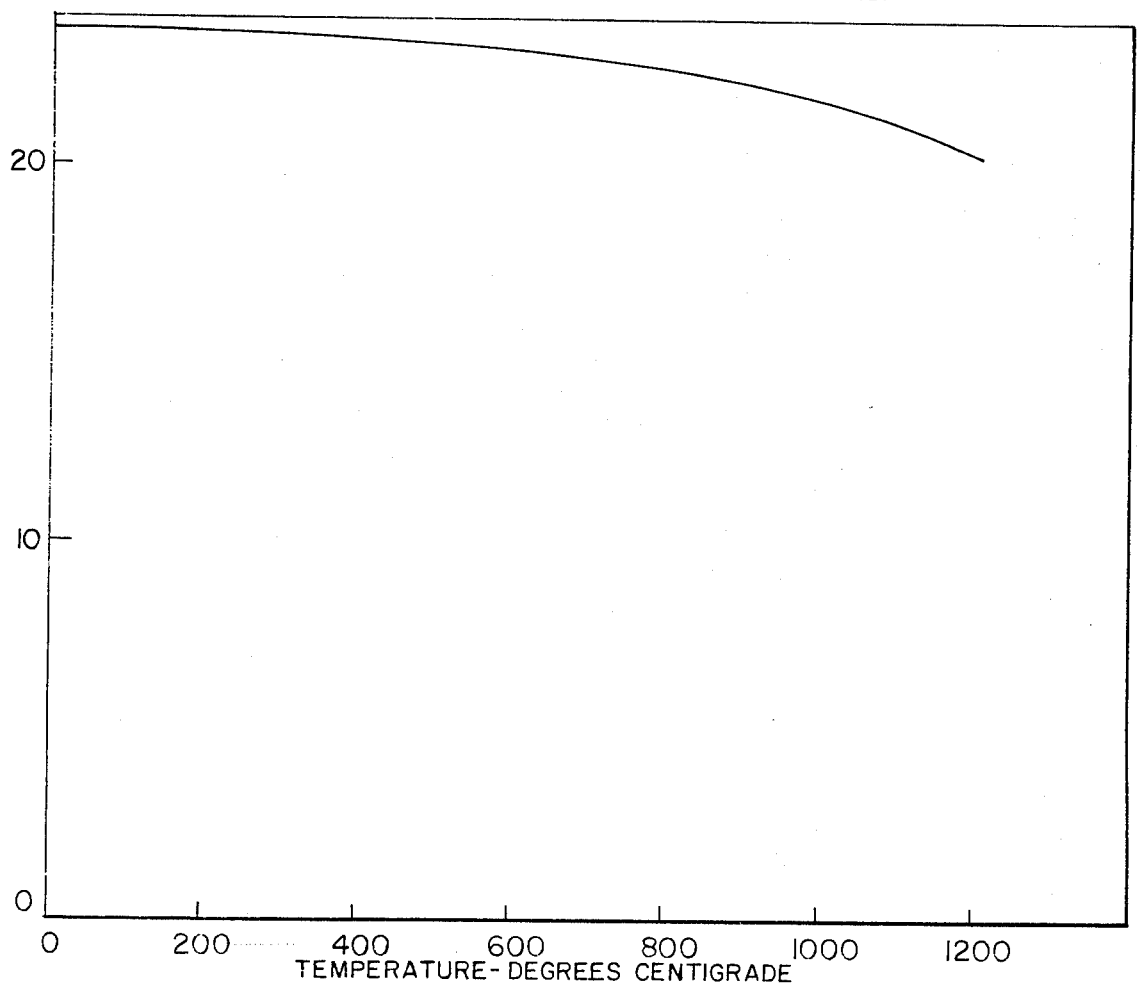

3,972,183

GAS DISSOCIATION THERMAL POWER SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention is directed to solar heaters and more particularly to a solar system for generating electrical power.

The conventional approaches to obtaining power from sunlight in solar thermal power systems are to concentrate sunlight onto a light absorbing surface to produce a hot zone in which either water is boiled to produce steam or in which a heat transfer medium such as liquid sodium is heated and used to carry heat to a central reservoir where the accumulated heat is used to operate a steam boiler. These approaches have the following difficulties: In the steam boiler approach, either many small power generating systems must be used if large amounts of energy are to be produced, or steam must be collected over large distances. If good efficiency is to be maintained, the steam must be at high pressure and moderately high temperature, with the result that large costs are encountered in the form of high pressure tubing. Also, the daily heating and cooling of the long pipes mean that daily extension and contraction of the piping system is encountered, increasing the likelihood of mechanical failure. The latter problem is even greater with the use of a high temperature, heat transfer medium, and additional problems are encountered due to energy loss in the transfer lines due to heat conduction to the atmosphere. Extreme measures, such as vacuum jacketing, are resorted to in order to control this problem.

SUMMARY OF THE INVENTION

This invention provides a solution to the problem of transfering to a single central energy storage facility the energy in the collected hot zones of a multiplicity of sunlight concentrators. The invention comprises a two component chemical processing system connected with circulation piping and pumps. One implementation of the invention makes use of the reversible chemical reaction $SO_3 = SO_2 + \frac{1}{2} O_2 - 22K$ cal/mole of heat. In this system, the first component is a dissociation reaction chamber. Largely $SO_3$ vapor is passed through the dissociation chemical reaction chamber, which is located in the hot zone of a solar furnace. In this reaction chamber, which is maintained at about 900°C, $SO_3$ is largely dissociated into $SO_2 + O_2$ with absorption of heat. The resultant $SO_2 + O_2$ is made to flow through pipes to a central energy reservoir. At the central reservoir the $SO_2$ and $O_2$ enter the second component of the chemical system, a recombination reaction chamber. In the recombination reaction chamber, the $SO_2$ and $O_2$ are recombined at about 550°C in the presence of a Pt catalyst, such as is used in the contact process for production of sulfuric acid. The chemical energy released in the recombination reaction is made to flow into a thermal energy reservoir in the form of a reservoir of partially molten, partially "frozen" salt eutectic, e.g., $NaCl + CaCl_2$. The reaction product, $SO_3$ is then made to flow through a second pipe back to the dissociation reaction chamber in the hot zone of the solar furnace. A blower type circulation pump provides the pressure differential that is required to keep the gas flowing in the closed cycle circulation system provided for the $SO_3$, $SO_2$ and $O_2$ fluid.

In a practical energy producing system, many solar furnaces producing many hot zones are used and the $SO_2 + O_2$ produced in individual units is combined and collected into trunk lines and delivered to a single central facility.

To improve the energy collection efficiency of the described system, and to permit circulation lines to operate at temperatures below 100°C, two additional components must be added to the system. Counter current heat exchangers must be used at each solar furnace so that the outflowing $SO_2 + O_2$ heats the inflowing $SO_3$. As a result of this heat flow in the heat exchanger, the outflowing $SO_2 + O_2$ leaves the heat exchanger at about 100°C, rather than at about 900°C, as exists in the hot zone of the solar furnace. Similarly at the central energy reservoir the outflowing 550°C $SO_3$ is passed through a larger counter current heat exchanger so that its heat is transferred to the inflowing $SO_2 + O_2$. As a result, the outflowing $SO_3$ leaves the central reservoir heat exchanger at about 100°C. The resultant relatively low temperature of the circulation lines reduces heat losses and eases engineering problems.

In the above system, all exposed pipes are coated with thermal insulation to reduce heat loss, and all heat exchangers are also thermally insulated from the air environment.

The key element of this invention is the use of hot zones in solar energy collectors to provide high temperature energy which is converted into chemical energy in a reversible gas phase chemical reaction, combined with a gas circulation system which delivers the reaction products to a second, but lower temperature, hot zone at which the chemical reaction is reversed with release of heat energy at this second hot zone. The released heat can be used to furnish energy for a conventional steam boiler-turbine-electrical generating facility, or can be otherwise used for chemical processing as exemplified by the Beulah process by which water is converted into oxygen plus hydrogen in a 5-step chemical reaction sequence, or by the thermal dissociation of kerogen in oil shale to produce petroleum distillates.

BRIEF DESCRIPTION OF THE DRAWINGS

FIG. 5 illustrates the mechanism by which the sun reflectors are rotated to follow the sun.

FIGS. 6a and 6b illustrate prism reflector with the reflection of the sun from the prism.

FIG. 7 illustrates the heat of reaction of $SO_2 + \frac{1}{2} O_2 \rightarrow SO_3$ Vs temperature degrees centigrade.

DETAILED DESCRIPTION

Figure 1:
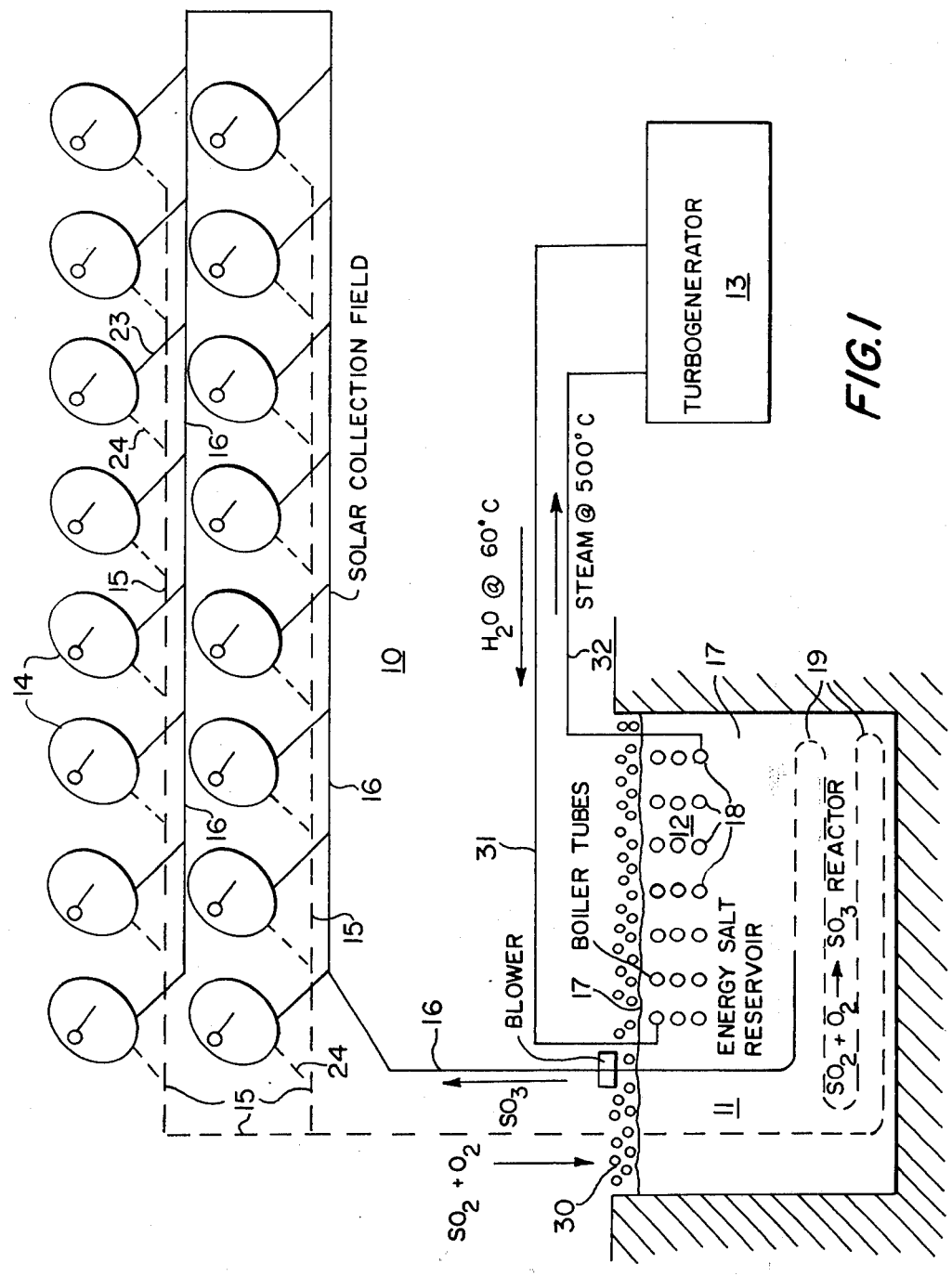
FIG. 1 is a schematic diagram of the overall system.

Now referring to the drawings, there is shown by a schematic diagram in FIG. 1 a partial solar energy-electrical generation system made in accordance with the teaching of this invention. As shown, the system includes a solar energy collection field 10, a reactor-energy heat transfer storage reservoir 11 in combination with a boiler-stream generator 12 which operates a turbogenerator 13 that generates electrical energy as a result of the heat produced by the solar energy collection field. The solar energy collection field comprises a plurality of individual solar furnaces 14 which are interconnected with each other and with the reactor energy reservoir by suitable insulated pipes 15, 16, pumps, valves, etc., in a closed pipe system. Energy transferred between the individual solar collectors and the heat transfer storage reservoir is effected by using a reversible chemical reaction in a gaseous working fluid. A suitable working fluid is $SO_3$ gas which dissociates into $SO_2$ and $O_2$ with the absorption of heat energy. In turn the $SO_2$ and $O_2$ is catalytically recombined to produce $SO_3$ plus heat energy. The heat energy given off during the recombination heats a salt 17 in the reservoir. Heat is transferred to an arrangement of boiler tubes 18 within which water is heated and changed into steam. The steam operates the turbogenerator 13. The turbogenerator 13 includes a condenser which converts the steam back to water which water is pumped to the boiler in a water-steam cycle as is well known in the art. Electrical energy produced by the turbogenerator is used for any desired purpose.

Figure 2:
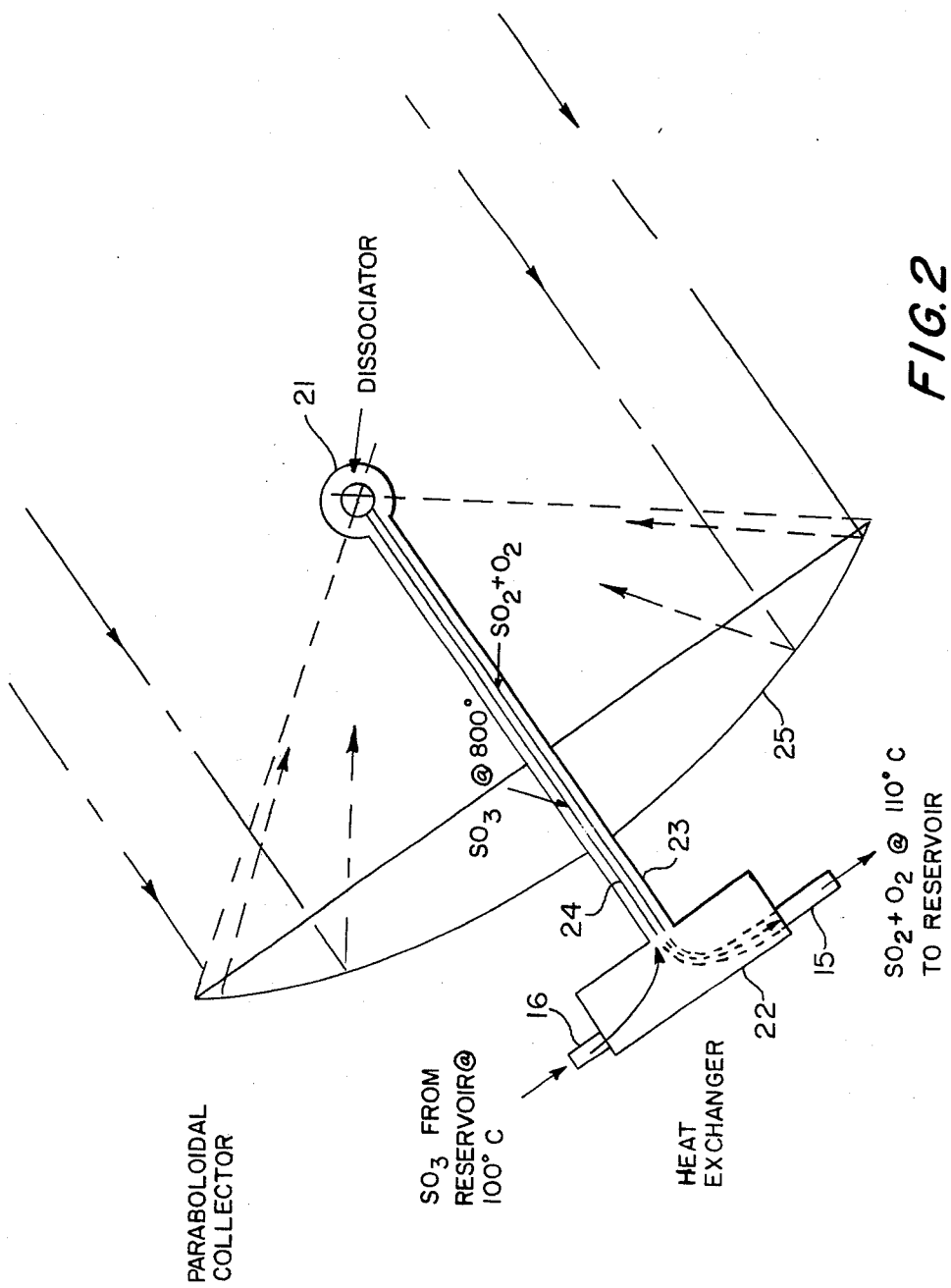
FIG. 2 illustrates a single solar furnace for gas dissociation.

FIG. 2 illustrates a single solar collector 14 with a representative gas dissociation reactor 21 and attached counter current heat exchanger 22 to which the gas transfer pipes 23 and 24 are connected. Each solar collector includes a paraboloidal reflector 25 which is directed toward the sun to collect the radiation from the sun. The sun radiation is focused onto a gas dissociation chamber 26 which heats the gas within the container to about 950°C. As shown, the $SO_3$ from the reservoir is returned to the heat exchanger 22 through pipes 16 and directed to the solar dissociation reactor 21 from the heat exchanger 22 by an outer pipe 23 which surrounds pipe 24. The $SO_3$ is heated by the $SO_2$ + $O_2$ in pipe 24 which is in turn cooled by the surrounding $SO_3$. The $SO_3$ is heated further in the dissociation chamber 26 where the $SO_3$ dissociates into $SO_2$ + $O_2$ with absorption of heat.

Figure 3:
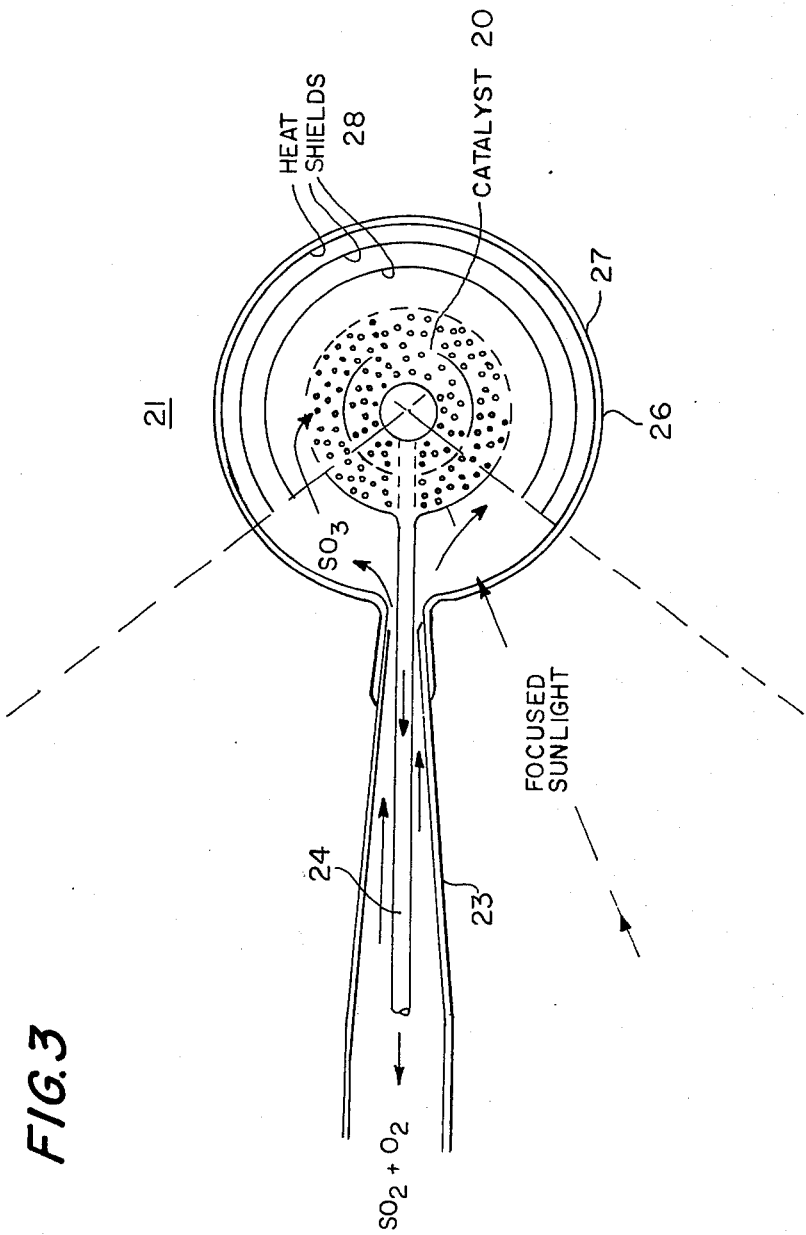
FIG. 3 illustrates in greater detail the gas dissociation reactor.

FIG. 3 illustrates in greater detail the dissociation and the incoming and outgoing gas lines. As shown, the dissociation reactor 21 includes a domed quartz bubble 27. On the side away from the focused light, heat shields 28 prevent the heat from escaping from the back side of the chamber. The reactor further includes the gas distillation chamber 26 which is in the form of a porous sphere with a ceramic surface with a catalyst 20 therein such as used in the sulfuric acid industry. The catalyst accelerates dissociation in the chamber to produce the necessary reaction in the $SO_3$ to carry out the teaching of this invention. The input and output lines 23 and 24 are shown for feeding the $SO_3$ into the dissociation chamber and carrying the $SO_2$ + $O_2$ from the solar heater chamber. The catalyst may be platinized asbestos placed on perforated plates one inch apart. Similar noble metal dispersions in a porous mass may also be used.

The heater reservoir 11 includes therein a solid salt 17 such as NaCl, $CaCl_2$ eutectic (approximately 33% molar $CaCl_2$). The $SO_2$ + $O_2$ passes through a plurality of reactor pipes 19 in the bottom of the reservoir which gives off heat to the salt, melting the salt and then recombines back to $SO_3$. The $SO_3$ is then pumped back to the solar heaters. In the reactor pipes $SO_3$ + $O_2$ recombines in the presence of a catalyst at 500°C – 600°C liberating the heat of recombination. The salt has a latent heat of fusion of 6.8k cal $mol^{-1}$ with a density of 1.83 gm $cm^{-3}$. The melted salt heats the water fed into the boiler tubes 18 through pipes 31 in the upper portion of the reservoir to change the water into steam at about 500°C. The steam is fed to the turbogenerator 13 through steam pipes 32 to operate the turbogenerator as is known in the prior art. Turbogenerators built in accordance with AIEE-ASME standard specifications for large condensing steam turbine generators are suitable electricity generating units. (See Mark's Standard Handbook for Mechanical Engineers, 9–77).

A layer of heat insulating material 30 such as vermiculite or other light weight chemically nonreactive blanket is placed on top of the salt to prevent heat loss.

It is well known that NaCl, $CaCl_2$ salt eutectic will condense to form a salt crust on the boiler pipes, therefore a boiler pipe scraper is provided to be moved along the lengths of boiler pipe to scrape free the condensed salt crust. The salt crust will fall to the bottom of the reservoir where the salt will be melted by the reaction heat produced by the $SO_2$ + $O_2$ recombination reaction.

Figure 4:
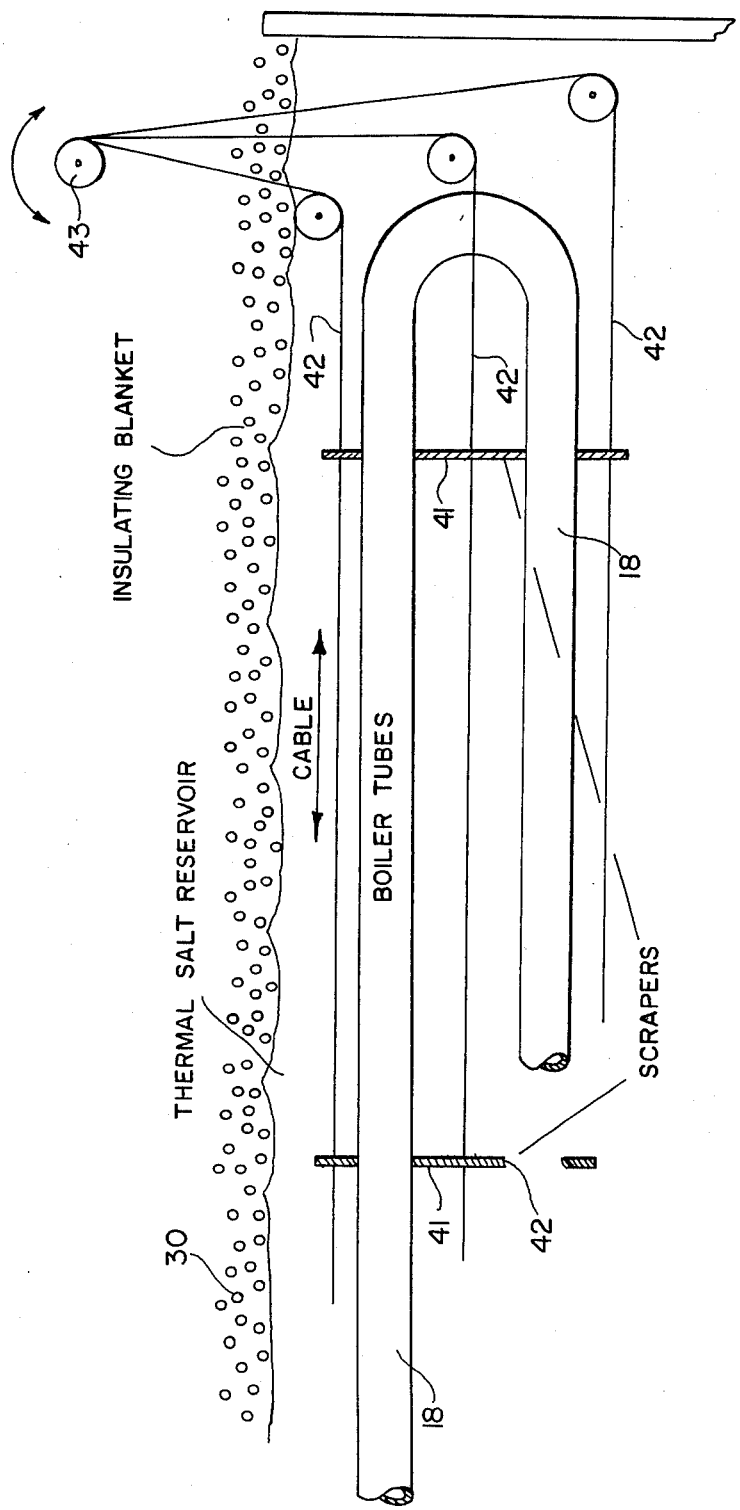
FIG. 4 illustrates a cable-scraper system for scraping salt from the pipes.

FIG. 4 illustrates a cable-scraper arrangement for cleaning the boiler tubes 18. As shown, the scraper mechanism 41 has passages 42 through which the tubes are placed. The passages are substantially the same diameter as the boiler tubes so that the mechanism will scrape the tube surface. A cable 42 connected to the scraper mechanism moves the scraper along the tubes in either direction depending on rotation of the control mechanism 43 about which the cables operate.

A baseline design for a 100 megawatt gas dissociation powerplant is outlined below. In this design 75% sunny skies have been assumed, 49% solar energy collection efficiency including atmospheric transmission, 8:00 AM to 4:00 PM useful collection, and a steam turbine-generator efficiency 80% of Carnot, for a system operating between 450°C and 60°C. The energy reservoir has been approximately sized for three-day storage, i.e., to provide 7200 megawatt hours of electrical production with no sunlight for three days.

The solar collection field for such a system as shown in FIG. 1 covers three square miles which is 20% covered by a set of 47,000 solar furnaces. Each solar furnace uses a 23 ft. diameter sunlight concentrator 25 as shown in FIG. 2. Collectors are mounted on axles 33 aligned with collector center of gravity. Axles are mounted in bearings 34 which are fixed to a semicylindrical structural trough 35 oriented in a north-south direction and free to rotate on rollers 36 about a north-south axis. Solar pointing is achieved by rotating the semicylindrical trough and by rotating the paraboloid reflectors about their mounting axles. The paraboloid reflectors are ganged by connecting rods so that they rotate together, see FIG. 5.

The individual paraboloid reflectors may comprise a metal backing and a transparent plastic reflecting surface. The backing is made up of spot-welded pie-shaped, sheet metal U-members. Its function is to provide structural support and protection to the plastic members and to protect the plastic members from wind loading. The plastic reflector is made up of 13 "gores." The front surface of the "gores" approximates the paraboloidal surface of the backing metal dish. The back surface comprises adjacent, radially aligned 90° prismatic surface as shown in FIGS. 6a and 6b. FIG. 6a illustrates the prismatic lens and 6b the reflection of the sunlight. The configuration of this surface determines the mirror quality. These prisms totally reflect incident light FIG. 6b and focus it on the chemical reactor surface. In one plane they act as corner reflectors, in the other, they act as plane mirrors. The "gores" are made either of transparent plastic polycarbonate or of cast bottle glass similar to that used in throwaway bottles. Metallized mirror reflectors may be used.

The gas dissociation reactor comprises a spherical chamber mounted in a transparent enclosure and surrounded by reflective heat shields. (See FIG. 3). The transparent enclosure consists of a domed quartz bubble which permits entrance of convergent light onto the cylinder. The cylinder has a rough reentrant ceramic surface of texture similar to that of gas mantle material, and contains a mix of rare earth oxides and thorium dioxide so as to provide a high ratio of visible to infrared emissivity. It also is made with a porous structure permitting passage of the $SO_3$ gas. It is filled with a packing of platinized asbestos or vanadium oxide.

The gas recombination reactor in the reservoir 11 is made up of long sections of steel piping 19 packed with platinized asbestos and located along the floor of the molten-solid salt reservoir.

The collection fluid network is shown in FIG. 1. Gaseous $SO_3$ at 100°C and 3 atmospheres absolute is driven by large blowers at the electrical generating plant heat transfer reservoir. Gas is tapped off the main trunk conduits by small pipes and circulated through individual solar furnaces. The $SO_3$ enters the solar furnace assembly through flexible tubes followed by an insulated counter current heat exchanger mounted on the paraboloid reflector support structure. From the furnace, $SO_2$, $SO_3$ and $O_2$ gas mixtures are delivered back through the countercurrent heat exchanger, followed by a flexible pipe conduit to ground, followed by a small pipe to the main return conduit. After delivery to the central heat storage area, the collected gas enters the gas recombination heat transfer reservoir through a large central counter-current heat exchanger. Output $SO_3$ with residual $SO_2$ flows out through this central heat exchanger, into the blower assembly and back to the delivery conduit network.

FIG. 7 is a graph which illustrates the heat of reaction of $SO_2 + \frac{1}{2} O_2 \rightarrow O_3$ Vs temperature degrees centigrade.

Figure 8:
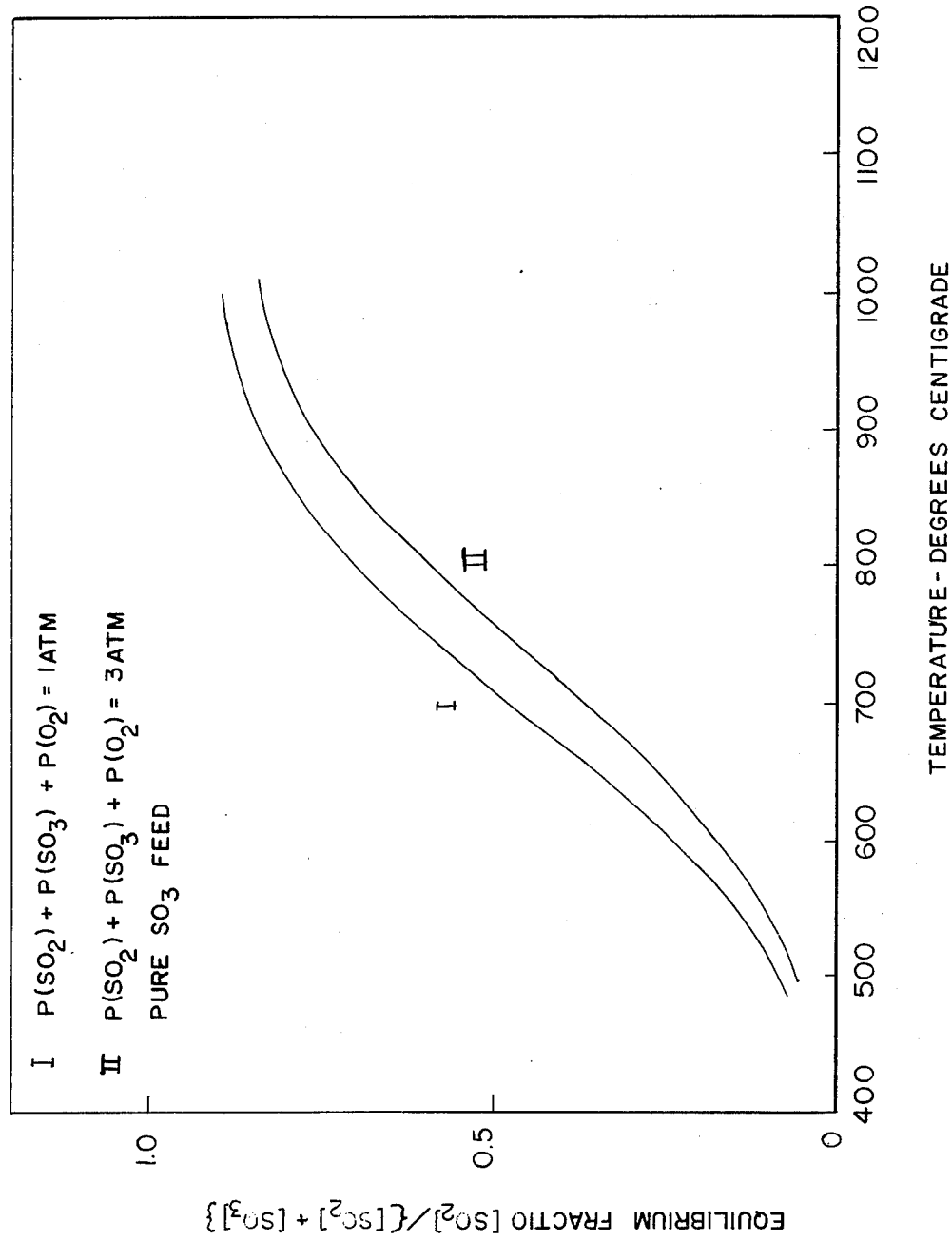
FIG. 8 illustrates a graph of the equilibrium fraction $[SO_2]/[[SO_2] + [SO_3]]$ Vs temperature for reaction $SO_2 + \frac{1}{2} O_2 \rightarrow SO_3$ under conditions that total pressure is kept constant.

FIG. 8 illustrates a graph of the equilibrium fraction $[SO_2]/[[SO_2] + [SO_3]]$ Vs temperature for reaction $SO_2 + \frac{1}{2} O_2 \rightarrow SO_3$ under conditions that total pressure is kept constant.

The heat reservoir and boiler is a large swimming pool type structure 170' × 170' × 100' and filled with a salt mix of inexpensive mixed chlorides such as $CaCl_2$ and NaCl. The gas recombination reaction tubes 19 are on its bottom. The steam boiler tubes 18 are mounted somewhat below the top of the reservoir level. A floating layer of vermiculite 30 or other lightweight, chemically nonreactive insulating blanket provides thermal insulation on the top of the salt. The entire structure is recessed below ground level to provide earth insulation on the sides and bottom. Boiler pipes extend through the insulating blanket into the melt. Mechanically driven scrapers remove accumulating salt solids on the boiler pipes. Alternatively a set of large wire brushes may be provided to continuously scrape away soft condensing salt forming on the boiler pipes, maintaining adequate thermal conduction from the salt liquid to the metal pipes and permitting the heavy solid salt to sink down to the reservoir's bottom as freezing proceeds and energy is withdrawn.

The salt in the reservoir is heated by recombination of the $SO_2 + O_2 \rightarrow SO_3$ giving off heat during the recombination thereby heating the water in the boiler tubes to generate steam. The steam produced in the boiler operates the turbogenerator to produce the necessary electrical power.

Since the reservoir contains considerable amount of salt, the heat in the salt will be sufficient to operate the steam generator at least 72 hours without the benefit of sunlight for chemically reacting the $SO_3$. Therefore the described system is believed to be sufficient in size to continually produce electrical energy as a result of the suns energy, since the sun should shine sufficiently to maintain the heat.

FIG. 1 is a simple system which illustrates the principles of the invention and does not show every solar heater, etc., required to cover the solar heat area, as set forth above. The drawings are illustrative only and are presented only to illustrate the system.

Obviously many modifications and variations of the present invention are possible in light of the above teachings. It is therefore to be understood that within the scope of the appended claims the invention may be practiced otherwise than as specifically described.

What is claimed and desired to be secured by Letters patent of the United States is:

1. A solar thermal power system for generating electrical energy, which comprises:
    a solar energy collection field comprising a plurality of individual solar furnaces for chemical dissociation of a fluid into its chemical components;
    a heat transfer heat storage reservoir including a heat transfer means therein;
    means for transmission of said fluid chemical components from said solar furnaces to said heat transfer storage reservoir at a temperature below that at which dissociation occurred for recombination thereof into its original chemical state giving off heat;
    means for transmission of said fluid back to said solar furnaces;
    a boiler means in said reservoir for converting water into steam;
    a steam turbogenerator for generating electrical energy; and
    means for transmitting water from said generator to said boiler means and transmitting steam to said turbogenerator.

2. A solar thermal power system for generating electrical energy as claimed in claim 1; wherein,
    said fluid dissociated by said solar furnace is $SO_3$ which dissociates into $SO_2 + O_2$ with heat absorption.

3. A solar power system as claimed in claim 2; wherein,
    each of said solar furnaces comprises a paraboloid reflector, a reaction chamber into which sunlight is focused, a reentrant porous surface in said chamber for permitting passage of said $SO_3$, catalysts within said reentrant surface, and heat reflectors within said chamber to prevent heat loss.

4. A solar power system as claimed in claim 3; wherein, said heat transfer means in said reservoir is a salt eutectic.

5. A solar power system as claimed in claim 4; wherein said salt is a pure salt.

6. A solar power system as claimed in claim 4; wherein, said salt is a mix of NaCl and $CaCl_2$.

7. A solar power system as claimed in claim 3; wherein,
said paraboloid reflector comprises a plurality of prisms which reflect light onto said solar furnace.

8. A method of producing electrical energy by use of solar energy; which comprises,
focusing sunlight onto a container to produce a temperature of about 900°C;
dissociating a chemical fluid within said container into its chemical reaction components with absorption of heat energy;
recombining said chemical components giving off heat to heat a heat transfer medium;
heating a water supply by use of said heat transfer medium to produce steam;
and feeding said steam to a turbogenerator to operate said turbogenerator thereby generating electrical energy.

9. A method as claimed in claim 8; wherein;
said chemical fluid is $SO_3$ and the chemical reaction is $SO_2 + O_2 +$ heat energy.

10. A solar thermal power system for generating electrical energy as claimed in claim 1; wherein,
said fluid is a dissociatable gas.

* * * * *